United States Patent [19]

Preedy et al.

[11] Patent Number: 5,376,598

[45] Date of Patent: Dec. 27, 1994

[54] FIBER REINFORCED CERAMIC MATRIX LAMINATE

[75] Inventors: Kristina S. Preedy, Redmond; Frederick H. Simpson, Seattle, both of Wash.

[73] Assignee: The Boeing Company, Seattle, Wash.

[21] Appl. No.: 212,397

[22] Filed: Jun. 27, 1988

Related U.S. Application Data

[63] Continuation-in-part of Ser. No. 106,746, Oct. 8, 1987.

[51] Int. Cl.$^5$ ....................... C04B 35/52; C04B 35/56
[52] U.S. Cl. ......................... 501/89; 156/89; 264/113; 264/125; 427/397.7; 428/698; 428/902; 501/88; 501/95; 501/97
[58] Field of Search ............ 264/102, 103, 125; 427/397.7; 428/698, 902; 501/88, 89, 95, 97; 106/99; 156/62.2, 89

[56] References Cited

U.S. PATENT DOCUMENTS

| | | | |
|---|---|---|---|
| 4,314,852 | 2/1982 | Brennan et al. | 501/88 |
| 4,435,455 | 3/1984 | Prewo et al. | 428/36 |
| 4,485,179 | 11/1984 | Brennan et al. | 501/32 |
| 4,560,603 | 12/1985 | Giacomel | 428/86 |
| 4,828,774 | 5/1989 | Andersson et al. | 264/60 |

OTHER PUBLICATIONS

Levitt, S. R., *High-strength graphite fibre/lithium aluminosilicate composites*, 8 J of Materials Sci. 793–806 (1973).

Rice, R. W., et al., *Refractory-Ceramic-Fiber Composite: Progress, Needs, and Opportunities*, Ceramic Proc., Sep.-Oct. 1982, 698–703.

Bacon, J. F. et al, *Glass Matrix Composites II–Alumina Reinforced Glass*, United Technologies Research Center.

*Primary Examiner*—Michael Lusignan
*Attorney, Agent, or Firm*—John C. Hammar

[57] ABSTRACT

Tough ceramic products can be prepared without exotic pressure fabricating techniques by use of a matrix laminate comprising a continuous fiber ceramic reinforcement in tow or woven form for strength, stiffness, and toughness and a ceramic matrix generally comprising (a) a filler, such as mullite; (b) ceramic reinforcing whiskers, such as silicon nitride or silicon carbide, for fine-scale interlaminar shear resistance (c) a binder, such as colloidal silica; and (d) an activator, such as a trona-like material including sodium and carbonate. The matrix is brushed into the fiber reinforcement, which is then laid up, dried, and cured. Tandem ceramic composites can be fabricated.

18 Claims, 1 Drawing Sheet

FIBER REINFORCED CERAMIC MATRIX LAMINATE

REFERENCE TO RELATED APPLICATION

This invention is a continuation-in-part application based on U.S. patent application Ser. No. 106,746 entitled "Tandem Ceramic Composite" by Baker and Preedy, filed Oct. 8, 1987.

TECHNICAL FIELD

This invention relates generally to a whisker and fiber reinforced ceramic matrix laminate and its method of use.

BACKGROUND ART

Many aerospace systems, such as engine exhaust ducts, nose cones, firewalls, and reentry shield surfaces, surfaces are exposed to high temperatures or large temperature gradients and must be insulated. Each application has unique problems which have rendered it difficult to provide an adequate thermal insulation that can be tailored for optimum performance.

Fiber insulation generally is weak and friable. It normally requires a surface cover to allow it to be handled without abrasion or erosion and to provide a toughened interconnecting surface for attaching the fiber insulation to other substructures. In U.S. Pat. No. 4,093,771, Goldstein discloses a reinforced fiber ceramic comprising a borosilicate glass coating on the surface of reusable silica insulation. In U.S. Pat. No. 4,381,333, Stewart discloses a two-layer glass coating for reinforcing silica insulation. The base layer has a high emittance and is preferably formed by combining a reactive borosilicate glass with an emittance agent, such as silicon tetraboride, silicon hexaboride, boron, or silicon carbide. The outer layer is formed from discrete, sintered glass particles to provide a high scattering coefficient. Preferably, fused silica or a reactive borosilicate glass having a higher silica content than the base layer is used for the outer layer. In either the Goldstein or Stewart ceramics, the coating is sprayed onto the underlying fiber insulation before firing to form a glass.

Another ceramic insulation can be formed witch an unsolidified silica glass felt sandwiched between silica glass fiber cloth. The three layers are stitched together with silica glass thread (or another suitable refractory thread) and are bonded with adhesive to the surface to be protected. A layering effect may be achieved by superposing a stitched blanket of silica and aluminoborosilicate fibers (commercially available under the trademark NEXTEL from 3M Company) over a separate, stitched blanket of silica fibers. By staggering the blankets and using suitable emittance coatings on the outer surfaces of the blankets, control of the insulative characteristics can be achieved, thereby countering the temperature distribution on and gradient through the insulation.

Fiberformed ceramic insulation with surprising physical properties is described in U.S. Ser. No. 698,496, and is made by forming a slurry of ceramic fibers, molding the slurry to form a soft felt mat, drying the mat, and incrementally introducing a sol-gel glass binder into the mat to form a rigid mat. The incremental addition of the sol-gel binder is accomplished through a unique multiple impregnation technique in which a small amount of binder is initially impregnated into the mat, is gelled, and is cured to stabilize the mat dimensionally, allowing handling and further processing of the mat. The mat is strengthened thereafter to its final strength by successive additions of glass binder. This technique cures the mat to a rigid, predetermined shape without appreciable shrinking of the resultant structure, and is contrasted with prior processes in which the entire binder is introduced either in one impregnation of the mat or by incorporating the binder in the fiber-containing slurry prior to the molding or felting operation. U.S. Pat. No. 3,702,279 to Ardary et al. and U.S. Pat. No. 3,935,060 to Blome et al. exemplify these prior processes.

A vacuum-felting process tends to align the ceramic fibers parallel to the forming surface, producing an anisotropic material having reduced flatwise tensile strength. This anisotropic material can be mechanically strengthened by stitching the mat with glass or other high-temperature refractory thread in a direction that is normal or at angles to the mat fibers. If the mat has layers, the stitching provides additional connection between the layers. Stitching can also be used to anchor the glass fabric of the coating to the mat.

The fiberformed insulation usually includes a network of ceramic fibers that are disposed in a plurality of layers, with fibers within each layer intersecting other fibers within the same layer. Some fibers within each layer intersect fibers in adjacent layers. To strengthen the layered network, sol-gel glass bonds are formed where the ceramic fibers intersect.

Fiberformed ceramics of this nature sometimes lack necessary toughness or flexural strength, especially at the point of attachment to the structural material. They can be improved, however, with reinforcing skins.

Ceramic parts that exhibit adequate strength and toughness for structural applications generally have been formed by hot press techniques that convert glasses to dense crystals, as described in U.S. Pat. No. 4,485,179. There, tows of fiber "tape" impregnated with glass powder were laminated and then consolidated at 1450° C. and 1000 psi for 15 minutes in a vacuum. The hot press equipment is large in comparison to the part, because of the need to supply high temperatures, special atmospheres, and high pressures can be achieved. Difficulties arise in molding parts that include complex curvatures, and the conventional hot press equipment cannot accommodate large parts.

SUMMARY OF THE INVENTION

We have developed a ceramic matrix laminate that can be produced at low temperatures and substantially ambient pressure and that is useful for forming either (1) tough, refractory, freestanding parts that are resistant to thermal shocks or (2) comparable skins to toughen and strengthen fiberformed ceramic insulation. The ceramic products have properties similar to hot press ceramics, but are made by a simpler process.

A unique feature of the laminate of the present invention is that it utilizes continuous fibers to reinforce a whisker or discontinuous short ceramic fiber reinforced refractory cementitious matrix. The continuous ceramic fibers greatly increase the tensile strength and modulus of the resulting composite, improve toughness, and improve the thermal shock resistance. The whiskers or small diameter short ceramic fibers improve the attachment of the matrix cement to the continuous, larger diameter, ceramic fibers by mechanical rather than by chemical means. The improved mechanical attachment of the matrix cement to the continuous reinforcing fibers increases the interlaminar shear strength of the resulting composite, which produces composites having higher flexural strength and stiffness than can be achieved using a formulation that lacks the whiskers.

The whisker and fiber reinforced ceramic matrix laminate of the present invention can be formed into a self-supporting structure or laid up on the surface of fiberformed ceramic insulation, other ceramic insulation, or a mandrel without applied pressure to set at ambient temperature to a tough ceramic composite. Free water within the structure can then be removed by firing the structure at relatively low temperatures around 100° C. A higher temperature cure (between about 300°-600° C.) may be desirable depending on the thickness of the laminate, the rate of heating, or the intended use for the composite. Higher temperature curing ensures that the free water is liberated, and the resulting composite is less susceptible to damage when exposed to high temperature. Unless the laminate is dried such exposure can produce steam which will weaken the composite.

When used in conjunction with fiberformed ceramic insulation to produce a tandem ceramic or sandwich ceramic composite, the laminate provides a hard, tough skin to overcome the handling and attachment difficulties otherwise associated with the fiberform's friable, abrasion-sensitive nature. By the addition of the skin to the fiberform, the specific stiffness and strength can also be greatly enhanced. Large, structurally efficient, refractory parts having complex curvature can be produced. Such parts would be impractical to produce by hot pressing or high temperature sintering operations because of the size of equipment required.

Thus, the laminate can be used to strengthen and protect friable surfaces against abrasion or erosion, particularly those surfaces having complex curvature that cannot be protected by hot-press techniques, or to incorporate toughened and strengthened mounting flanges or attachment areas onto fiberformed ceramic insulation or other ceramic materials that have lower strength and flexibility.

Sizing on the ceramic fiber reinforcement should be removed in accordance with the manufacturer's standard instructions prior to use in the laminate. The fiber reinforcement may be in tow, tape, or woven fabric form.

A cementitious filler, such as high purity mullite ($3Al_2O_3 \cdot 2SiO_2$), is generally mixed with silicon carbide or silicon nitride whiskers, a silicic sol binder, and an activating agent which polymerizes the binder to form a cementitious matrix. The whiskers generally are high aspect ratio (L/D) single crystals, and provide interlaminar shear strengthening at a much finer level then the fiber reinforcement. Silicon nitride whiskers suitable for this application can be prepared in accordance with the method described in U.S. Pat. Nos. 4,579,699 or 4,388,255, but other whiskers, such a Tateho silicon nitride or silicon carbide can be used. The preferred binder is DuPont LUDOX AS-40 activated with a sodium-carbonate compound similar to the mineral trona. Naigai MMS grade (−325 ANSI mesh) mullite is preferred. The matrix preferably comprises about 34.1 wt. % mullite, 7.6 wt. % whiskers, 56.7 wt. % silicic sol binder that includes colloidal silica, and 1.6 wt. % activator. The whiskers are added to the binder and sonicated to break up agglomerated whiskers and to mix the materials. Thereafter, a mixture of the mullite and activator are added and the matrix is sonicated again to ensure thorough mixing. The matrix is a fluid paint consistency that can be readily applied to the fiber reinforcement with a brush or any other suitable means to form the laminate.

In one preferred application, as described in U.S. Ser. No. 106,746, the matrix laminate (particularly in woven cloth form) is laid up over the desired surface, such as a fiberformed ceramic insulation to form a tandem composite. The fiber reinforcement in the laminate is compressed against the surface to work the matrix further into the reinforcement (and into the underlying insulation, if applicable). Generally a squeegee and composite wet lay-up techniques are used to complete the composite. Additional matrix or laminate can be applied during the lay-up as necessary to achieve the desired thickness. Multiple plies of laminate may be applied, as desired. The reinforcement may be oriented in any desired fashion over any desired shape or form. After lay-up, the preform can be stored, after wrapping in a release film (like FEP) for several days. Slow drying in air at room temperature completes the rigid, "green" or preform composite, which is subsequently cured. The matrix laminate can be applied as separate plies or in a continuous roll.

The preform composite is cured and dried in ambient air. During gellation and polymerization of the silicic sol, the part is covered with an impervious film, such as FEP. After the cure, the film is removed and the part is dried in ambient air for at least about 16 hours. The remaining water is, then, removed by heating the preform in an air-recirculating oven heated to a temperature in the range of about 71°-100° C. (160° to 212° F.). Additional heat treatments may also be employed. The resulting preform composite can be machined. Maximum strength and toughness for the matrix laminate and the tandem composite can be achieved after machining, if desired, by a further heat treatment at about 1200°-1500° F. (649°-816° C.).

DETAILED DESCRIPTION OF THE INVENTION

Figure 3:
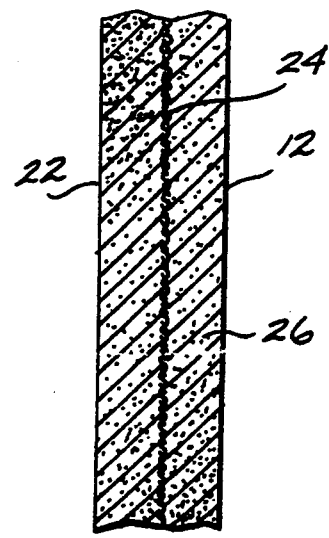
FIG. 3 is a partial cross-sectional view taken generally along line 3—3 of FIG. 2.

The fiber-reinforced ceramic matrix laminate 22 of the present invention generally is made by removing any sizing from the continuous ceramic fiber reinforcement 24 (FIG. 3) in accordance with the manufacturer's standard instructions. The fiber reinforcement may be in tow or woven fabric form. The tow form, however, should be converted to a tape by winding the tow. A cementitious refractory filler or aggregate, such as high purity mullite ($3Al_2O_3 \cdot 2SiO_2$), is generally mixed with silicon carbide or silicon nitride whiskers, a silicic sol binder, and an activating agent which polymerizes the binder to form a cementitious matrix 26 (FIG. 3). The whiskers generally are high aspect ratio (L/D) single crystals that provide fine scale interlaminar shear strengthening. Silicon nitride whiskers suitable for this application can be prepared in accordance with the method described in U.S. Pat. Nos. 4,579,699 or 4,388,255, but other whiskers, such a Tateho silicon nitride can be used. The preferred binder is DuPont LUDOX AS-40 activated with a sodium-carbonate compound similar to the mineral trona. Naigai MMS grade (−325 ANSI mesh) mullite is preferred. The matrix generally comprises about 34.1 wt. % mullite, 7.6 wt. % whiskers, 56.7 wt. % silicic sol binder, and 1.6 wt. % activator. The whiskers are added to the binder and sonicated to break up agglomerated whiskers and to mix the materials. Thereafter, a mixture of the mullite and activator are added and the matrix is sonicated again to ensure thorough mixing. The matrix is a fluid paint consistency that can be readily applied to the fiber reinforcement with a brush (or any other suitable means) to form the laminate.

While mullite (alumina silicate) is the preferred refractory filler, other silicates, such as cordierite, and refractory oxides, such as alumina or zirconia, can be used, We have found desirable physical properties, however, with mullite, and prefer it. Mixtures of these fillers can also be used.

Generally the matrix 26 will have between about 5–10 wt % whiskers so that the product possesses the improved toughness and flexural modulus. Although strengthening can be achieved with skins that include the reinforcement, mullite, binder, and activator without any whiskers, the best results are achieved with whisker reinforcement to complement the fiber reinforcement.

The matrix includes only sufficient activator to catalyze the polymerization. We have found 1.6 wt. % to be acceptable when the ratio of mullite to binder is about 34:56. Those skilled in the art will understand that the concentration of activator can be adjusted, and may be related to the concentration of silica binder or the mullite: binder ratio.

If desired, the silica component in the matrix can include a mixture of fused silica and colloidal silica, although substantially pure colloidal silica (LUDOX AS-40) is preferred.

Figure 2:
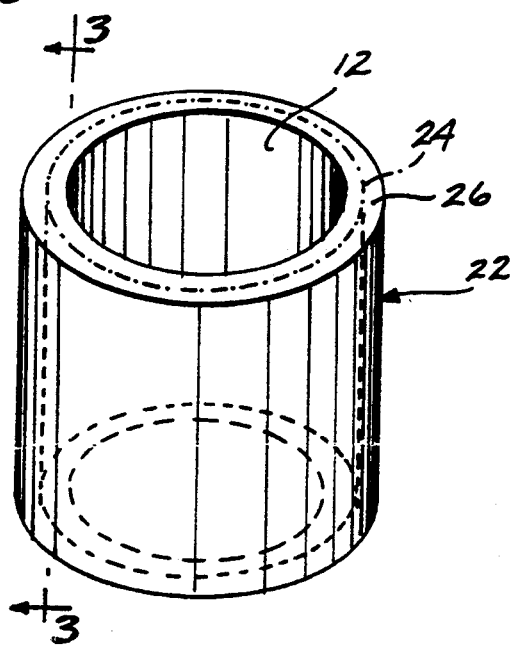
FIG. 2 is an isometric of another embodiment of a tandem ceramic composite using the matrix laminate of the present invention.

In a preferred embodiment, the matrix laminate 22 of the present invention (particularly with woven cloth reinforcement) is laid up over a fiberformed ceramic insulation 12 (FIGS. 2 & 3) to form a tandem ceramic composite, as suggested by Baker and Preedy. The fiber reinforcement 24 in the laminate 22 (reinforcement and matrix together) is compressed against the surface to work the matrix 26 further into the reinforcement 24 and into the underlying fiberformed ceramic insulation 12 for good adhesion between the layers of the composite. Generally a squeegee and composite wet lay-up techniques are used to complete the composite. Additional matrix can be applied during the lay-up as necessary to achieve the desired thickness, or multiple plies of laminate 22 may be applied, as desired, in separate plies or in a continuous roll. The reinforcement 24 may be oriented in any desired fashion over any desired shape or form. Curing generally begins by wrapping the lay-up with FEP film and storing the wrapped part for several days. Slow drying in air at room temperature completes the "green" or preform composite, which is then cured and dried by heating in an atmospheric, air recirculating oven at about 160°–212° F. (71°–100° C.) until the free water is removed. Thereafter, the temperature is increased to about 600° F. (316° C.) and maintained until the composite reaches equilibrium at which point the binder is cured. The composite can be machined. Maximum strength and toughness for the composite can be achieved after final machining by a further heat treatment at about 1200°–1500° F. (649°–816° C.). Following the final heat treatment(s), the composite can be machined with diamond or laser tools.

Figure 1:
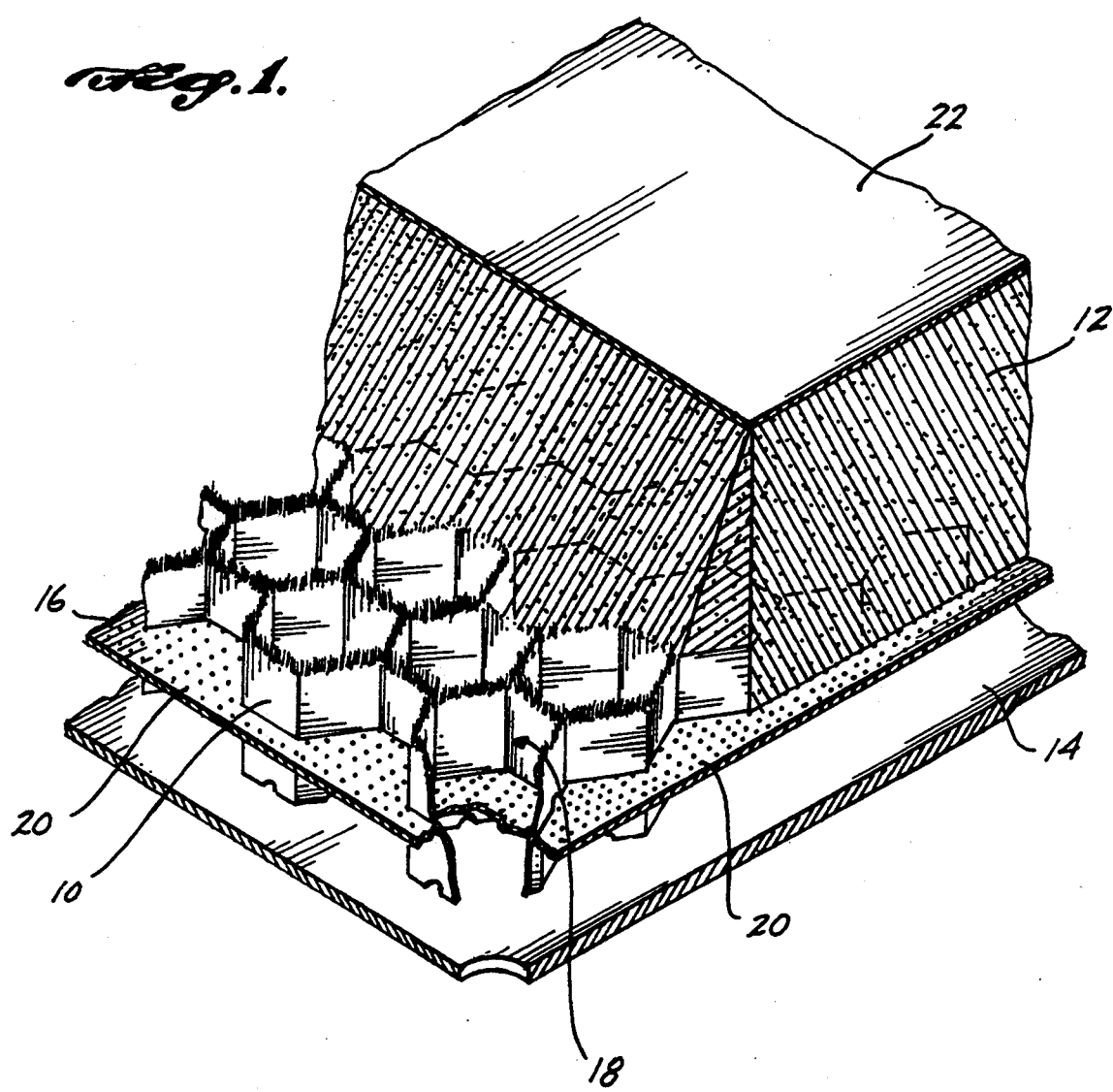
FIG. 1 is an isometric of a tandem ceramic composite using the matrix laminate of the present invention.

The fiberformed ceramic insulation 12 for the illustrated, preferred embodiment comprises a mat of discrete ceramic fibers that selectively intersect one another in a semi-random fashion and that are bonded with a sol-gel glass binder that forms bonds between the fibers at their intersections. This insulation 12 may be formed in a variety of shapes including flat structures, hollow cylinders, frustums (i.e. cones), or other complex shapes. The insulation may be bonded directly to the surface to be protected, may be formed on a substrate that is subsequently attached to the surface, or may be made freestanding by preparation on a mandrel. A honeycomb core 10 (FIG. 1) may be used to position a layer of the fiberformed ceramic insulation 12 in spaced relation to an underlying surface 14 to provide thermal protection for the surface 14 through enhanced conductive and convective thermal resistance. A septum 16 within the core 10 divides each cell 18 into inner and outer cavities. The fiberformed insulation 12 fills only the outer cavities. This arrangement is preferably achieved by vacuum casting the insulation 12 into the outer cavities of the honeycomb core 10 by drawing a vacuum through perforations 20 in the septum 16 to draw at least one slurry of the fibers into the outer cavities of the cells 18. The fibers are then bonded together to form the ceramic insulation 12. As shown in FIG. 1, the matrix laminate 22 of the present invention is applied to form an impact-resistant coating over the honeycomb composite insulation.

The fiberformed insulation 12 is generally made in accordance with the Baker method of U.S. patent application Ser. No. 698,496. Preferably the fiberformed ceramic insulation 12 is heat treated at the intended use temperature prior to applying the matrix laminate 22.

The cured matrix laminate 22 can withstand temperatures of about 1200°–2000° F. (649°–1093° C.) with little or no property degradation, and is relatively tough ceramic material having a flexural stress in the range of 10,000–20,000 psi in 3-point bending. This toughness provides the essential characteristics required for many specialized aerospace application where conventional ceramics or organic (hydrocarbon) composites are unacceptable. The matrix laminate 22 is easy to apply and cures at relatively low temperatures to a tough ceramic without the necessity of applied pressure. The ceramic is useful to strengthen fiberformed ceramic insulation, as described, to protect metals, or to form freestanding structural ceramic parts.

To apply the matrix laminate to a metal, a strain isolation pad to accommodate the coefficient of thermal expansion mismatch between the metal and ceramic is brazed to the metal. This pad can be a metal mesh, screen, or foam. The pad is painted (filled) with the matrix prior to lay-up of additional "tapes" of the reinforcement and matrix over the pad.

The ceramic made from the matrix laminate 22 is tougher than conventional fired ceramics, is easier to fabricate and suitable for producing parts larger than those which are practical to produce by hot pressing glasses or glass/ceramics, is cheaper than common $SiC/Si_3N_4$ reinforced ceramics, and is more stable to thermal oxidation than graphite.

The following Examples illustrate preferred features of the invention.

EXAMPLE I—PREPARATION OF MATRIX

A ceramic matrix was made by mixing 20 g of Tateho silicon carbide whiskers with 150 g of LUDOX AS-40 colloidal silica and mixed with a sonicator for 3 minutes. Ninety grams of Naigai mullite was mixed with 5 g of a trona-like mineral (i.e. Activator 23) with a mortar and pestle and then added to the mixture of colloidal silica and whiskers. The resulting mixture was sonicated for 2 minutes.

EXAMPLE II—PREPARATION OF FIBERFORM SLURRY

A fiber slurry of 60 gallons of water and 300 grams of aluminosilicate fibers approximately 0.25 inches in length and one micron in diameter was mixed by circulating the components for 30 minutes through a polyethylene-lined, air-operated, double-diaphragm pump into a 90-gallon polyethylene tank. A filter mold was attached to the pump, and 30 gallons of slurry (about ½ the volume) were pulled through the mold, depositing about 150 grams of fiber in a soft mat on the surface of the mold. The mat was removed from the mold and was dried in a circulating-air oven at about 200° F. until all the water was removed.

An alumina sol-gel binder according to the Yoldas technique and comprising about 459 grams of aluminum isopropoxide, 4053 grams of distilled water, and 18 grams of hydrochloric acid was refluxed at a controlled temperature for three days, and was, then, distilled to a solution containing seven grams of alumina per 100 cc.

The resulting sol was wicked into the dried fiber mat until the entire mat was saturated. To convert the sol to a gel, the saturated mat was placed in a sealed nylon bag with a small outlet tube that was connected to a bottle of ammonia gas. The bag was inflated with gas at a flow rate designed to keep the bag fully expanded. After one hour, the gas was turned off and the bag was opened, allowing the excess gas to escape. The fully gelled mat was removed from the bag, and cured for four hours in an air-circulating oven at about 160° F. (71° C.). After this initial four-hour period, the temperature was slowly increased to 600° F. (316° C.) over a five-hour period, before the temperature was rapidly lowered to 200° F. (94° C.) and maintained at 200° F. for two more hours.

Thereafter, the impregnating, gelling, and curing steps were repeated twice by (1) resaturating the mat in two successive applications with the alumina sol binder, (2) exposing the saturated mat to ammonia gas for one hour, and (3) then, heating the mat with substantially the same temperature regime as Example I to cure the second addition of binder.

EXAMPLE III—PREPARATION OF TANDEM COMPOSITE

A fiberformed ceramic cylinder was formed in accordance with the method of Example II. A strip of Nextel 312, 900 dernier fabric was heat-cleaned following manufacturer's specifications. The fibrous ceramic cylinder was saturated with water to prevent migration of the colloidal silica from the matrix mixture prepared in accordance with Example I. The matrix mixture was brushed onto the surface of the cylinder and on one side of the fabric strip. The strip was laid matrix side down on the cylinder and a squeegee was used to work the matrix material into the fabric. When the strip was about to overlap itself, another layer of matrix mixture was brushed on the outer fabric surface on the cylinder and the strip was allowed to overlap itself on top of the newly placed matrix mixture. A squeegee was used to work the matrix into the fabric.

An FEP film was placed over the surface and additional squeegeeing was done. After two days, the FEP film was removed, and the part was dried at room conditions for one day and then in an air circulating oven. After about 8 hours at 160° F. (71° C.), the temperature was raised gradually to 600° F. (316° C.) over about 4 hours, held at 600° F. for about 3 hours, raised again to 1200° F. (649° C.) over about 4 hours, and held at 1200° F. for 1 hour before cooling to room temperature in about 2 hours. Thereafter, the part was treated again in a 1500° F. (816° C.) oven for about 1 hour.

The resulting tandem composite cylinder was tested for 5 hours in a WR24-7 turbojet test at 1500° F. (816° C.) with no visible signs of deterioration.

Those skilled in the art will understand that the present invention provides a highly flexible approach to the formation of lightweight, tough, and strong insulating structures that are suitable for use at high temperatures and with large temperature gradients.

Other embodiments of the invention will also be apparent to those skilled in the art from a consideration of this specification. The specification and examples are illustrative only, and should be interpreted liberally to protect the invention. Therefore, the invention should be limited only as is necessary by construing the claims in light of this description and the pertinent prior art.

We claim:

1. A reinforced ceramic matrix laminate suitable for lay-up and cure at low temperatures and at ambient pressure to yield tough, cured ceramics and having both coarse and fine-scale reinforcement, comprising:
   (a) a continuous ceramic fiber reinforcement in tow or cloth form to provide coarse reinforcement for improving strength, stiffness, and toughness; and
   (b) a cementitious matrix including a cementitious filler, reinforcing whiskers of silicon nitride or silicon carbide to provide fine reinforcement for improved interlaminar shear resistance, and a binder that contains colloidal silica.

2. The laminate of claim 1 further comprising activator in the matrix.

3. The laminate of claim 2 wherein the activator is a trona-like material containing sodium and carbonate, and the filler includes mullite.

4. The laminate of claim 3 wherein ratio (by weight) of the components of the matrix are about 34.1% mullite: 7.6% whiskers: 56.7% binder: 1.6% activator.

5. The laminate of claim 3 wherein the fiber reinforcement includes aluminoborosilicate fibers.

6. A fiber reinforced ceramic having a high toughness as exhibited by its non-linear stress-strain characteristics when tested in flexure, and a flexural stress of between about 10,000–20,000 psi in 3-point bending achieved without hot pressing, comprising:
   (a) a continuous ceramic fiber reinforcement in tow or cloth form for strengthening, stiffening, and toughening; and
   (b) a matrix including a mullite filler; reinforcing whiskers selected from the group consisting of SiC, $Si_3N_4$, or mixtures thereof for fine-scale interlaminar shear resistance; a colloidal silica binder; and an activator that is a trona-like material including sodium and carbonate,
   wherein the ceramic is prepared by:
      (i) mixing the whiskers and binder;

(ii) adding the filler and activator to form the matrix;
(iii) mixing the matrix;
(iv) applying the matrix to the reinforcement;
(v) working the matrix into the reinforcement to form a ceramic laminate;
(vi) drying the laminate in air at ambient pressure;
(vii) heating the laminate at ambient pressure and to further dehydrate the matrix; and
(viii) increasing the flexural strength of the laminate by heat treating the dried laminate at ambient pressure and at a temperature in excess of 1000° F.

7. The ceramic of claim 6 wherein step (viii) occurs at at least about 1200° F. in the presence of air.

8. The ceramic of claim 7 wherein heating step (vii) occurs at ambient pressure in the presence of air.

9. A method for making a fiber reinforced ceramic, comprising the steps of:
(a) sonicating a mixture of ceramic whiskers and a binder to form a substantially well mixed mixture substantially free from agglomerated whiskers;
(b) adding a ceramic filler and an activator to the mixture of step (a) for form a matrix paint;
(c) sonicating the matrix paint to mix the matrix paint; and
(d) applying the matrix paint to a fiber reinforcement.

10. The method of claim 9 further comprising the steps of drying the fiber reinforced matrix in air at ambient pressure and curing the dried matrix at temperatures up to about 600° F.

11. The method of claim 10 further comprising the step of toughening the rigid matrix by heat treating the cured matrix at at least about 1200° F. in air at ambient pressure.

12. The method of claim 11 further comprising the step of laying up the fiber reinforced matrix on a mandrel or in a mold to obtain a desired shape.

13. A method for making a ceramic composite using a fiber reinforced ceramic matrix laminate comprising the steps of:
(a) preparing a ceramic laminate by infusing a ceramic matrix, comprising a ceramic filler, ceramic reinforcing whiskers for improved interlaminar shear resistance at a fine scale, a binder, and an activator, into a continuous fiber reinforcement in tow or cloth form;
(b) laying up the laminate on a mold;
(c) drying the laminate in air at ambient pressure; and
(d) increasing the flexural strength of the dried laminate by heat treating the laminate at ambient pressure in air at an elevated temperature.

14. The method of claim 13 wherein the step of preparing the ceramic laminate includes the substeps of:
(a) sonicating a mixture of the whiskers and binder to break up whisker agglomeration;
(b) adding the filler and activator to the mixture to form the ceramic matrix; and
(c) brushing the ceramic matrix into the continuous fiber reinforcement.

15. The method of claim 14 wherein the binder includes a silicic sol and the filler includes mullite.

16. The method of claim 13 wherein the step of drying includes the substeps of:
(a) initially drying the laminate at ambient temperature and ambient pressure; and
(b) heating the partially dried laminate at ambient pressure in air to a temperature of about 160°–212° F. to complete drying.

17. The method of claim 16 wherein the strengthening temperature of step d includes at least one treatment of at least about 1200° F.

18. The ceramic composite that is the product of the process of claim 16.

* * * * *